United States Patent
Kedar et al.

(10) Patent No.: US 10,764,095 B1
(45) Date of Patent: Sep. 1, 2020

(54) METHOD AND APPARATUS FOR TUNING A CONTINUOUS TIME LINEAR EQUALIZER

(71) Applicant: Mellanox Technologies, Ltd., Yokneam (IL)

(72) Inventors: Daniel Kedar, Harish (IL); Eyal David, Atzmon (IL); Johan Jacob Mohr, Copenhagen (DK); Stanislav Gurtovoy, Nesher (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/451,819

(22) Filed: Jun. 25, 2019

(51) Int. Cl.
  *H04L 25/03* (2006.01)
  *H04B 1/16* (2006.01)
  *H04L 25/02* (2006.01)

(52) U.S. Cl.
  CPC ........ *H04L 25/03057* (2013.01); *H04B 1/16* (2013.01); *H04L 25/0202* (2013.01)

(58) Field of Classification Search
  CPC .. H04L 25/03057; H04L 25/0202; H04B 1/16
  USPC ....................................................... 375/232
  See application file for complete search history.

(56) References Cited

U.S. PATENT DOCUMENTS

| 2014/0204991 A1* | 7/2014 | Huang | H03M 13/2957 375/232 |
| 2016/0080177 A1* | 3/2016 | Pan | H04L 25/03019 375/233 |

* cited by examiner

*Primary Examiner* — Kevin M Burd
(74) *Attorney, Agent, or Firm* — Alston & Bird LLP (57) ABSTRACT

Embodiments are disclosed for tuning a continuous time linear equalizer embedded in a receiver of a communication system. An example method includes receiving an N-point estimation of a channel pulse response associated with an input signal. The method further includes calculating an estimated power spectral density for one or more desired frequency bands. The method further includes updating one or more parameters of a continuous time linear equalizer to adjust one or more power densities of the one or more desired frequency bands based on the one or more estimated power spectral densities calculated. The method further includes calculating, for each desired frequency band, an estimated power spectral density after updating the one or more parameters of the continuous time linear equalizer to adjust the one or more power densities of the one or more desired frequency bands.

17 Claims, 4 Drawing Sheets

METHOD AND APPARATUS FOR TUNING A CONTINUOUS TIME LINEAR EQUALIZER

TECHNOLOGICAL FIELD

Embodiments of the present invention relate generally to a method and apparatus for tuning a continuous time linear equalizer circuit ("CTLE") in communication systems.

BACKGROUND

The present invention relates to tuning a continuous time linear equalizer circuit in a receiver for electrical and optical signals, such as quadrature amplitude modulation ("QAM") signals and pulse amplitude modulation ("PAM") signals. Communication systems are generally composed of a transmitter, a receiver, and a channel. The transmitter generates a signal conveying information, which, after being transmitted over the channel, is received and recovered at the receiver. Channels may be dispersive which means that both time and frequency of a transmitted signal may be dispersed or spread out overtime. To effectively recover information in the transmitted signal, a receiver may be implemented with a CTLE circuit configured to mitigate the effect of the dispersion. The present invention presents a method and apparatus for tuning such a CTLE circuit in a receiver.

BRIEF SUMMARY

Example embodiments described herein disclose a method and apparatus for tuning a continuous time linear equalizer circuit in a receiver. The details of some embodiments of the subject matter described in this specification are set forth in the accompanying drawings and the description below. Other features, aspects, and advantages of the subject matter will become apparent from the description, the drawings, and the claims.

In some embodiments, a computer implemented method for tuning a continuous time linear equalizer embedded in a receiver of a communication system is provided. The method comprises receiving an N-point estimation of a channel pulse response associated with an input signal. The method further comprises calculating one or more estimated power spectral densities for one or more desired frequency bands based on the N-point estimation. The method further comprises based on the one or more estimated power spectral densities calculated, updating one or more parameters of a continuous time linear equalizer to adjust one or more power densities of the one or more desired frequency bands. The method further comprises after updating the one or more parameters of the continuous time linear equalizer to adjust the one or more power densities of the one or more desired frequency bands, calculating, for each desired frequency band, an estimated power spectral density. The method further comprises determining if a set of stop conditions is satisfied. The method further comprises updating the one or more parameters of the continuous time linear equalizer to adjust the one or more power densities of the one or more desired frequency bands in an instance in which the set of stop conditions is not satisfied.

In some embodiments, the set of stop conditions is satisfied in an instance in which the one or more parameters are updated for a predefined number of times. In some embodiments, the predefined number of times is between 5 and 20, inclusive. In some embodiments, the set of stop conditions is satisfied once one or more pre-defined satisfactory power density ranges for the one or more desired frequency bands is achieved. In some embodiments, the N-point estimation of a channel pulse response associated with an input signal is in the form of a pulse response vector. In some embodiments, the one or more parameters of the continuous time linear equalizer is directionally updated to adjust the one or more power densities of the one or more desired frequency bands.

In another example embodiment an apparatus including a processor and at least one memory including computer program code for one or more programs is provided. The at least one memory and the computer program code are configured to, with the processor, cause the apparatus at least to receive an N-point estimation of a channel pulse response associated with an input signal. The at least one memory and the computer program code are further configured to, with the processor, cause the apparatus at least to calculate one or more estimated power spectral densities for one or more desired frequency bands based on the N-point estimation. The at least one memory and the computer program code are further configured to, with the processor, cause the apparatus at least to update one or more parameters of a continuous time linear equalizer to adjust one or more power densities of the one or more desired frequency bands based on the one or more estimated power spectral densities calculated. The at least one memory and the computer program code are further configured to, with the processor, cause the apparatus at least to, after updating the one or more parameters of the continuous time linear equalizer to adjust the one or more power densities of the one or more desired frequency bands, calculate an estimated power spectral density for each desired frequency band. The at least one memory and the computer program code are further configured to, with the processor, cause the apparatus at least to determine if a set of stop conditions is satisfied. The at least one memory and the computer program code are further configured to, with the processor, cause the apparatus at least to, in an instance in which the set of stop conditions is not satisfied, update the one or more parameters of the continuous time linear equalizer to adjust the one or more power densities of the one or more desired frequency bands.

In some embodiments, the set of stop conditions is satisfied in an instance in which the one or more parameters are updated for a predefined number of times. In some embodiments, the predefined number of times is between 5 and 20, inclusive. In some embodiments, the set of stop conditions is satisfied once one or more pre-defined satisfactory power density ranges for the one or more desired frequency bands is achieved. In some embodiments, the N-point estimation of a channel pulse response associated with an input signal is in the form of a pulse response vector. In some embodiments, the one or more parameters of the continuous time linear equalizer is directionally updated to adjust the one or more power densities of the one or more desired frequency bands.

In another embodiment, a computer program product including at least one non-transitory computer-readable storage medium having computer executable program code instructions stored therein is provided. The computer executable program code instructions includes program code instructions configured, upon execution, to receive an N-point estimation of a channel pulse response associated with an input signal. The computer executable program code instructions further includes program code instructions configured, upon execution, to calculate one or more estimated power spectral densities for one or more desired frequency bands based on the N-point estimation. The computer executable program code instructions further includes program code instructions configured, upon execution, to update one or more parameters of a continuous time linear equalizer to adjust one or more power densities of the one or more desired frequency bands based on the one or more estimated power spectral densities calculated. The computer executable program code instructions further includes program code instructions configured, upon execution, to calculate an estimated power spectral density for each desired frequency band after updating the one or more parameters of the continuous time linear equalizer to adjust the one or more power densities of the one or more desired frequency bands. The computer executable program code instructions further includes program code instructions configured, upon execution, to determine if a set of stop conditions is satisfied. The computer executable program code instructions further includes program code instructions configured, upon execution, to, in an instance in which the set of stop conditions is not satisfied, update the one or more parameters of the continuous time linear equalizer to adjust the one or more power densities of the one or more desired frequency bands.

In some embodiments, the set of stop conditions is satisfied in an instance in which the one or more parameters are updated for a predefined number of times. In some embodiments, the predefined number of times is between 5 and 20, inclusive. In some embodiments, the set of stop conditions is satisfied once one or more pre-defined satisfactory power density ranges for the one or more desired frequency bands is achieved. In some embodiments, the N-point estimation of a channel pulse response associated with an input signal is in the form of a pulse response vector. In some embodiments, the one or more parameters of the continuous time linear equalizer is directionally updated to adjust the one or more power densities of the one or more desired frequency bands.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein, are not provided to convey any qualitative assessment, but instead merely to convey an illustration of an example. Thus, use of any such terms should not be taken to limit the spirit and scope of embodiments of the present invention.

Electrical/optical communication systems generally include a transmitter, a receiver, and a channel. The transmitter generates a signal conveying information, which, after being transmitted over a channel, is received and recovered at the receiver. In the real world, transmission channels are non-ideal and introduces various unwanted effects that cause distortion of the signals, making the communication less reliable. For example, the channel may have a transfer function that introduce changes in the signal transmitted in the form of amplitude and/or phase changes. These changes distort the signal received at the receiver. Moreover, during transmission, inter-symbol interference ("ISI") may occur. ISI is a form of distortion of a signal in which one symbol interferes with subsequent symbols caused by the channel's low-pass characteristic. The presence of ISI makes the communication less reliable. In addition, the transmission channel may also distort the signal by attenuating higher frequencies more than lower frequencies. In addition, channels may be dispersive which may spread out the energy of the transmitted signal. All of these unwanted effects distort the signal in the transmission process. Therefore, equalization is needed to overcome these unwanted effects and to more accurately reconstruct the signal.

Many receivers for high speed communication are equipped with analog equalizers, such as continuous time linear equalizer ("CTLE") circuits, feed forward equalizer ("FFE") circuits, or the like. These type of analog circuits are generally power efficient.

A channel often acts as a low-pass filter for the signal transmitted, such that the magnitude of the low frequency components of a signal may stay the same but the magnitude of the high frequency components may be lessened. Accordingly, if the transmitted signal has a very large band-width, the signal frequency content may become greatly distorted, making it hard to detect and decode on the receiver side. A CTLE circuit may be able to serve as a high-pass filter at the receiver in order to tune down the magnitude of the low frequency components, thereby recovering the signal.

The CTLE circuit is usually configurable to compensate for unwanted channel frequency dependent attenuation on the signal. The configurable parameters may include a location of a zero and\or a pole, an amplified frequency band, an amplitude of gain, or the like. Tuning such configurable parameters is essential to achieve the desired result of recovering the signal. Traditional methods of tuning a CTLE circuit often require expensive designated hardware that operates at the full speed of the incoming signal. Such full speed designated hardware often operates by performing a brute force search for the best CTLE parameter configuration.

The full speed designated hardware utilizes a lot of power, space, and precious other resources in a receiver. Thus, it is desirable to tune the CTLE circuit with a directional approach rather than brute force approach. Embodiments of the present invention relate generally to a method and apparatus for a directional approach of tuning a CTLE circuit in communication systems that may be utilized with a time domain measurement.

Depending on the CTLE architecture, various parameters need to be tuned to achieve good channel equalization results. The CTLE parameters configuration is often referred to by its frequency domain behavior. The goal is to achieve a CTLE setting that has a frequency content that can equalize the lossy channel. For this purpose, an estimation of the channel pulse-response is used. Assume we have a N-point estimation of the channel pulse-response $h_n$, n=0, 1, ..., N−1. Using this estimation, we can calculate the estimated average power density in any frequency band $$[f_1, f_2], 0 \le f_1 \le f_2 \le \frac{\text{baud rate}}{2}.$$

An iterative process may be implemented in which the channel pulse-response samples $h_n$ are estimated. Then the CTLE parameters may be updated accordingly to increase or decrease the power density in the frequency bands of interest.

Figure 1A:
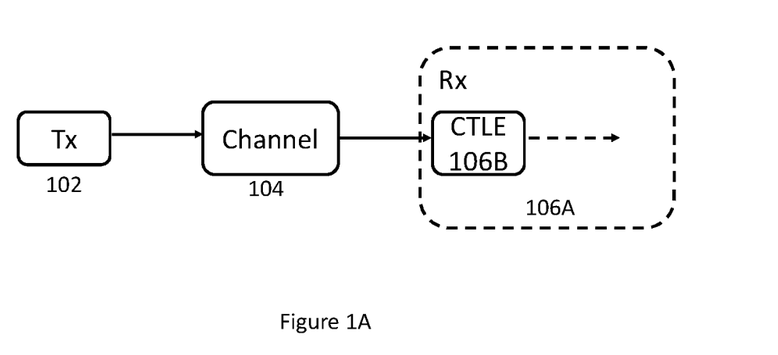
FIG. 1A illustrates an overview of the communication system according to example embodiments of the present invention.
Figure 1B:
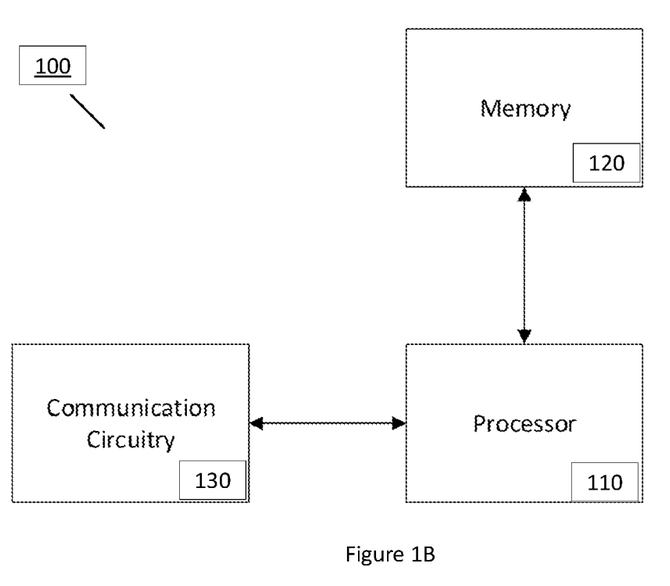
FIG. 1B illustrates an example computing system that may be embedded in the firmware of a receiver of a communication system according to example embodiments of the present invention.

FIG. 1A illustrates an overview of the communication system according to some embodiments. As illustrated in FIG. 1B, the communication system includes a transmitter (Tx) 102, a channel 104, and a receiver (Rx) 106A embedded with a CTLE circuit 106B. The channel 104 may have channel frequency dependent attenuation effects on a signal being transmitted from the transmitter to the receiver. The CTLE circuit may have configurable frequency response for compensating for such frequency dependent attenuation of the channel.

FIG. 1B illustrates an example computing system 100 that may be embedded in the firmware of a receiver of a communication system. The computing system 100 may be used for tuning the CTLE parameters. The computing system 100 may include or otherwise be in communication with a processor 110, a memory circuitry 120, and communication circuitry 130. In some embodiments, the processor 110 (which may include multiple or co-processors or any other processing circuitry associated with the processor) may be in communication with the memory circuitry 120. The memory circuitry 120 may comprise non-transitory memory circuitry and may include one or more volatile and/or non-volatile memories. In some examples, the memory circuitry 120 may be an electronic storage device (e.g., a computer readable storage medium) configured to store data that may be retrievable by the processor 110. In some examples, the data stored in the memory 120 may include a data related frequency response, frequency, CTLE parameters, power densities, or the like for enabling the apparatus to carry out various functions or methods in accordance with embodiments of the present invention, described herein.

In some examples, the processor 110 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 110 may also be embodied on various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 110 is a microprocessor.

In an example embodiment, the processor 110 may be configured to execute instructions, such as computer program code or instructions, stored in the memory circuitry 120 or otherwise accessible to the processor 110. Alternatively or additionally, the processor 110 may be configured to execute hard-coded functionality. As such, whether configured by hardware or software instructions, or by a combination thereof, the processor 110 may represent a computing entity (e.g., physically embodied in circuitry) configured to perform operations according to an embodiment of the present invention described herein. For example, when the processor 110 is embodied as an ASIC, FPGA, or similar, the processor may be configured as hardware for conducting the operations of an embodiment of the invention. Alternatively, when the processor 110 is embodied to execute software or computer program instructions, the instructions may specifically configure the processor 110 to perform the algorithms and/or operations described herein when the instructions are executed. However, in some cases, the processor 110 may be a processor of a device specifically configured to employ an embodiment of the present invention by further configuration of the processor by instructions for performing the algorithms and/or operations described herein. The processor 110 may further include a clock, an arithmetic logic unit (ALU) and logic gates configured to support operation of the processor 110, among other things.

The computing system 100 may optionally also include the communication circuitry 130. The communication circuitry may be any means embodied in either hardware or a combination of hardware and software that is configured to receive and/or transmit data from/to a network and/or any other device or module in communication with the computing system 100. In this regard, the communication interface may include, for example, supporting hardware and/or software for enabling communications. As such, for example, the communication circuitry 130 may include a communication modem and/or other hardware/software for supporting communication via cable, universal serial bus (USB), integrated circuit receiver, or other mechanisms.

Figure 2:
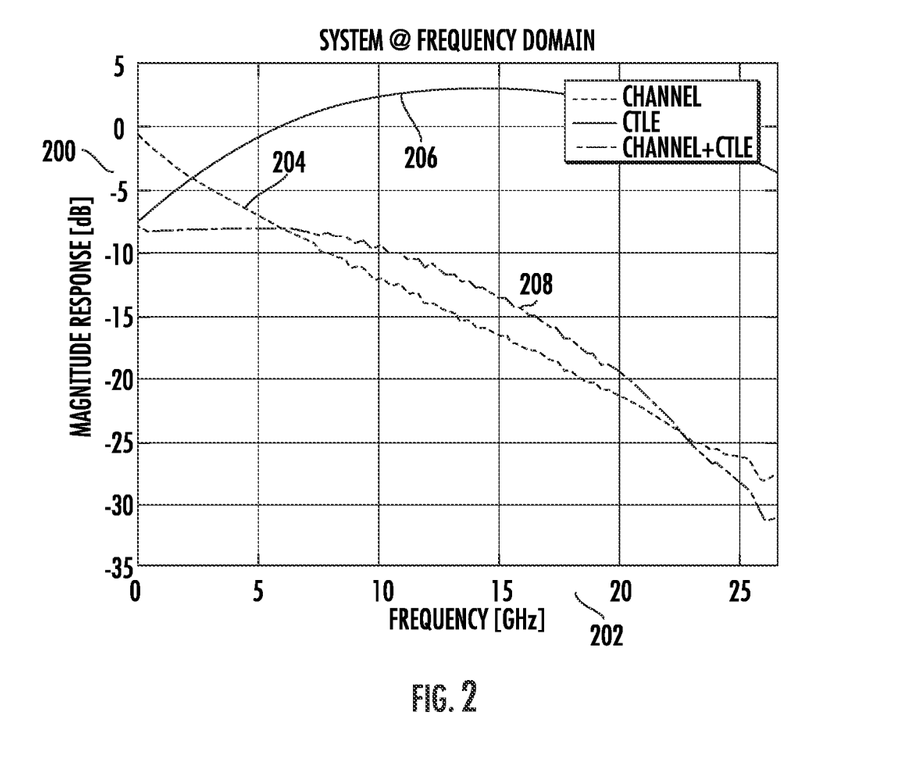
FIG. 2 illustrates a comparison of a frequency response of a channel and a frequency response of a channel after tuning of a CTLE circuit of a receiver that is tuned according to example embodiments of the present invention.

FIG. 2 illustrates a comparison of a frequency response of a channel and a frequency response of a channel after tuning of the CTLE using example embodiments. As illustrated in FIG. 2, the vertical axis 200 shows the magnitude response of the channel in decibels (dB) and the horizontal axis 202 of the figure shows the frequency in Giga Hertz (GHz). Line 204 is the frequency response of the channel without tuning of the CTLE. Line 206 is the frequency response of the CTLE. Line 208 is the frequency response after tuning of the CTLE using embodiments of the present invention. As illustrated in FIG. 2, in particular in line 208, the CTLE manages to flatten the frequency response of the channel in the frequency band of 0-7 GHz, thereby equalizing the frequency response of the channel in the frequency band of 0-7 GHz.

Figure 3:
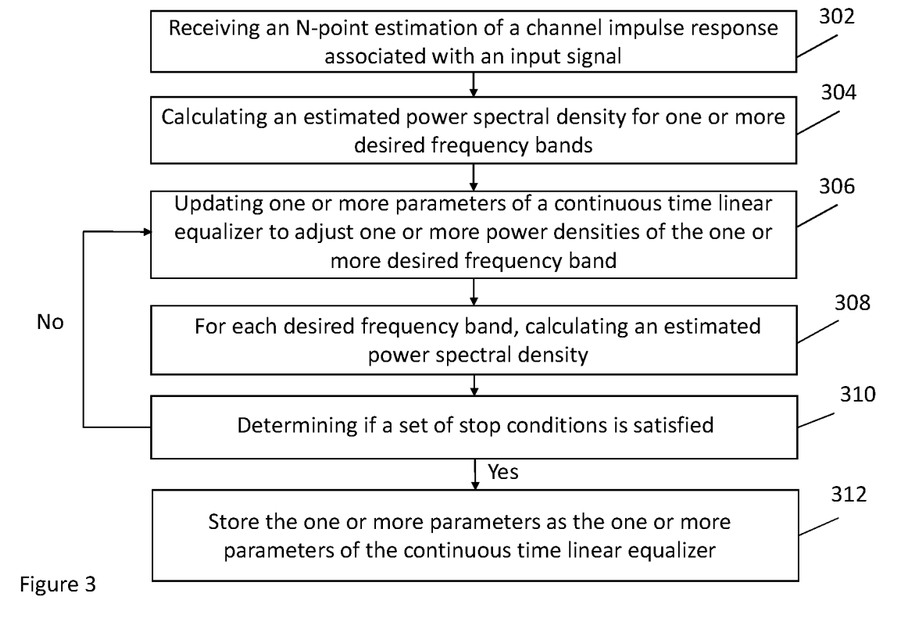
FIG. 3 is a flowchart illustrating an example method of operation of a communication system implementing a receiver having a CTLE circuit according to example embodiments of the present invention.

FIG. 3 is a flowchart illustrating an example method of operation of a communication system implementing a receiver according to example embodiments of the present invention. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 3 may, for example, be performed by the computing system illustrated in FIG. 1B.

In some embodiments, at operation 302, the communication system receives an N-point estimation of a channel pulse response associated with an input signal. The input signal encodes information in a plurality of bits. In some embodiments, the input signal is a non-return to zero (NRZ) signal or a PAM-4 signal. Based on the N-point estimation, an estimation of the power density can be calculated at a desired frequency band by applying an arithmetic operation to the pulse response estimation vector. The arithmetic operation may depend on the frequency band of interest. The desired frequency band may be pre-defined by the communication system. In some embodiments, the N-point estimation may be provided in the form of a pulse response vector $h[n]$, $n=0, 1, \ldots, N-1$. In some embodiments, each entry in the pulse response vector $h[n]$ may correspond to a point in the N-point estimation.

In some embodiments, at operation 304, the communication system calculates an estimated power spectral density for each desired frequency band. The power spectral density in a frequency band $f_1$ or $f_2$ may be denoted by $w_1$ and $w_2$. Similarly, the power spectral density in a frequency band fn may be denoted by $w_n$.

In some embodiments, at operation 306, the communication system updates one or more parameters of a continuous time linear equalizer to adjust one or more power densities of the one or more desired frequency bands based on the one or more estimated power spectral densities calculated. In some embodiments, the update may be changing a location of a zero and\or a pole, an amplified frequency, an amplitude of gain, or the like. In some embodiments, in a first iteration of operation 306, each of the increasing or decreasing that is associated with the one or more frequency bands may be a pre-defined increase or decrease of certain pre-defined CTLE parameters. In some embodiments, the pre-defined increase or decrease only defines a range and the exact increase or decrease may be performed pseudo randomly. Overall, the goal is to minimize the difference in value of the one or more power densities of the one or more desired frequency bands to equalize the one or more power densities.

In some embodiments, in a subsequent iteration of operation 306, if the value of the one or more power densities of the one or more desired frequency bands has been further equalized compared to the value of the one or more power densities of the one or more desired frequency bands in the previous iteration, the communication system may be configured to update the one or more parameters directionally (in the same direction), e.g., in a way that would result in the same direction of increasing or decreasing the one or more power densities of the one or more desired frequency bands. Similarly, in some embodiments, in a subsequent iteration of operation 306, if the value of the one or more power densities of the one or more desired frequency bands has not been further equalized (or farther away) compared to the value of the one or more power densities of the one or more desired frequency bands in the previous iteration, the communication system may be configured to update the one or more parameters directionally (in the opposite direction), e.g., in a way that would result in the opposite direction of increasing or decreasing the one or more power densities of the one or more desired frequency bands.

In some embodiments, in a subsequent iteration of operation 306, each of the increase or decrease that is associated with the one or more frequency bands may be pre-defined. The increase or decrease may be a pre-defined increase or decrease of certain pre-defined CTLE parameters. In some embodiments, the pre-defined increase or decrease only defines a range and the exact increase or decrease may be performed pseudo randomly. In some embodiments, the pre-defined increases or decreases may be pre-defined based on a difference of value between the one or more power densities of the one or more desired frequency bands.

In some embodiments, at operation 308, the communication system calculates an estimated power spectral density for each desired frequency band after updating the one or more parameters of the CTLE to adjust the one or more power densities of the one or more desired frequency bands and according to the updated one or more parameters.

In some embodiments, at operation 310, the communication system determines if a set of stop conditions is satisfied. The stop conditions may be defined in a way that ensures that the CTLE is sufficiently tuned. In some embodiments, the set of stop conditions comprises updating the one or more parameters have been updated a predefined number of times. In some embodiments, the predefined number of times may be between 5 and 20, inclusive. In some embodiments, the set of stop conditions comprises one or more pre-defined satisfactory power density ranges for the one or more desired frequency bands. If the set of stop conditions is not satisfied, the communication system may proceed with a subsequent iteration of operation 306, followed by operation 308 and operation 310. In some embodiments, the set of stop conditions is a defined condition regarding an impulse response estimation of a channel. In some embodiments, the set of stop conditions is defined by a using entity, such as a user, of the communication system that is not the manufacturer of the CTLE circuit.

In some embodiments, if the set of stop conditions is satisfied, at operation 312, the communication system stores the one or more parameters as the one or more parameters of the CTLE and updates the CTLE circuit according to the one or more parameters.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer implemented method for tuning a continuous time linear equalizer embedded in a receiver of a communication system, comprising:
   receiving an N-point estimation of a channel pulse response associated with an input signal in the form of a pulse response estimation vector;
   calculating one or more estimated power spectral densities for one or more desired frequency bands based on the N-point estimation by applying an arithmetic operation to the pulse response estimation vector;
   based on the one or more estimated power spectral densities calculated, updating one or more parameters of a continuous time linear equalizer to adjust one or more power densities of the one or more desired frequency bands;
   after updating the one or more parameters of the continuous time linear equalizer to adjust the one or more power densities of the one or more desired frequency bands, calculating, for each desired frequency band, an estimated power spectral density;
   determining if a set of stop conditions is satisfied; and
   in an instance in which the set of stop conditions is not satisfied, updating the one or more parameters of the continuous time linear equalizer to adjust the one or more power densities of the one or more desired frequency bands.

2. The computer implemented method of claim 1, wherein the set of stop conditions is satisfied in an instance in which the one or more parameters are updated for a predefined number of times.

3. The computer implemented method of claim 2, wherein the predefined number of times is between 5 and 20, inclusive.

4. The computer implemented method of claim 1, wherein the set of stop conditions is satisfied in an instance in which one or more pre-defined satisfactory power density ranges for the one or more desired frequency bands is achieved.

5. The computer implemented method of claim 1, wherein the one or more parameters of the continuous time linear equalizer is directionally updated to adjust the one or more power densities of the one or more desired frequency bands.

6. The computer implemented method of claim 1, wherein the set of stop conditions is defined by a user of the communication system.

7. An apparatus comprising a processor and at least one memory including computer program code for one or more programs, the at least one memory and the computer program code configured to, with the processor, cause the apparatus at least to:
   receive an N-point estimation of a channel pulse response associated with an input signal in the form of a pulse response estimation vector;
   calculate one or more estimated power spectral densities for one or more desired frequency bands based on the N-point estimation by applying an arithmetic operation to the pulse response estimation vector;
   based on the one or more estimated power spectral densities calculated, update one or more parameters of a continuous time linear equalizer to adjust one or more power densities of the one or more desired frequency bands;
   after updating the one or more parameters of the continuous time linear equalizer to adjust the one or more power densities of the one or more desired frequency bands, calculate an estimated power spectral density for each desired frequency band;
   determine if a set of stop conditions is satisfied; and
   in an instance in which the set of stop conditions is not satisfied, update the one or more parameters of the continuous time linear equalizer to adjust the one or more power densities of the one or more desired frequency bands.

8. The apparatus of claim 7, wherein the set of stop conditions is satisfied in an instance in which the one or more parameters are updated for a predefined number of times.

9. The apparatus of claim 8, wherein the predefined number of times is between 5 and 20, inclusive.

10. The apparatus of claim 7, wherein the set of stop conditions comprises one or more pre-defined satisfactory power density ranges for the one or more desired frequency bands.

11. The apparatus of claim 7, wherein the one or more parameters of the continuous time linear equalizer is directionally updated to adjust the one or more power densities of the one or more desired frequency bands.

12. The apparatus of claim 7, wherein the set of stop conditions is defined by a user of the communication system.

13. A computer program product comprising at least one non-transitory computer-readable storage medium having computer executable program code instructions stored therein, the computer executable program code instructions comprising program code instructions configured, upon execution, to:
   receive an N-point estimation of a channel pulse response associated with an input signal in the form of a pulse response estimation vector;
   calculate one or more estimated power spectral densities for one or more desired frequency bands based on the N-point estimation by applying an arithmetic operation to the pulse response estimation vector;
   based on the one or more estimated power spectral densities calculated, update one or more parameters of a continuous time linear equalizer to adjust one or more power densities of the one or more desired frequency bands;
   after updating the one or more parameters of the continuous time linear equalizer to adjust the one or more power densities of the one or more desired frequency bands, calculate an estimated power spectral density for each desired frequency band;
   determine if a set of stop conditions is satisfied; and
   in an instance in which the set of stop conditions is not satisfied, update the one or more parameters of the continuous time linear equalizer to adjust the one or more power densities of the one or more desired frequency bands.

14. The computer program product of claim 13, wherein the set of stop conditions is satisfied in an instance in which the one or more parameters are updated for a predefined number of times.

15. The computer program product of claim 14, wherein the predefined number of times is between 5 and 20, inclusive.

16. The computer program product of claim 13, wherein the set of stop conditions comprises one or more pre-defined satisfactory power density ranges for the one or more desired frequency bands.

17. The computer program product of claim 13, wherein the one or more parameters of the continuous time linear equalizer is directionally updated to adjust the one or more power densities of the one or more desired frequency bands.

* * * * *